Oct. 25, 1932.  W. L. GARLAND  1,883,896
CAR HEATING SYSTEM
Filed April 23, 1928   3 Sheets-Sheet 1
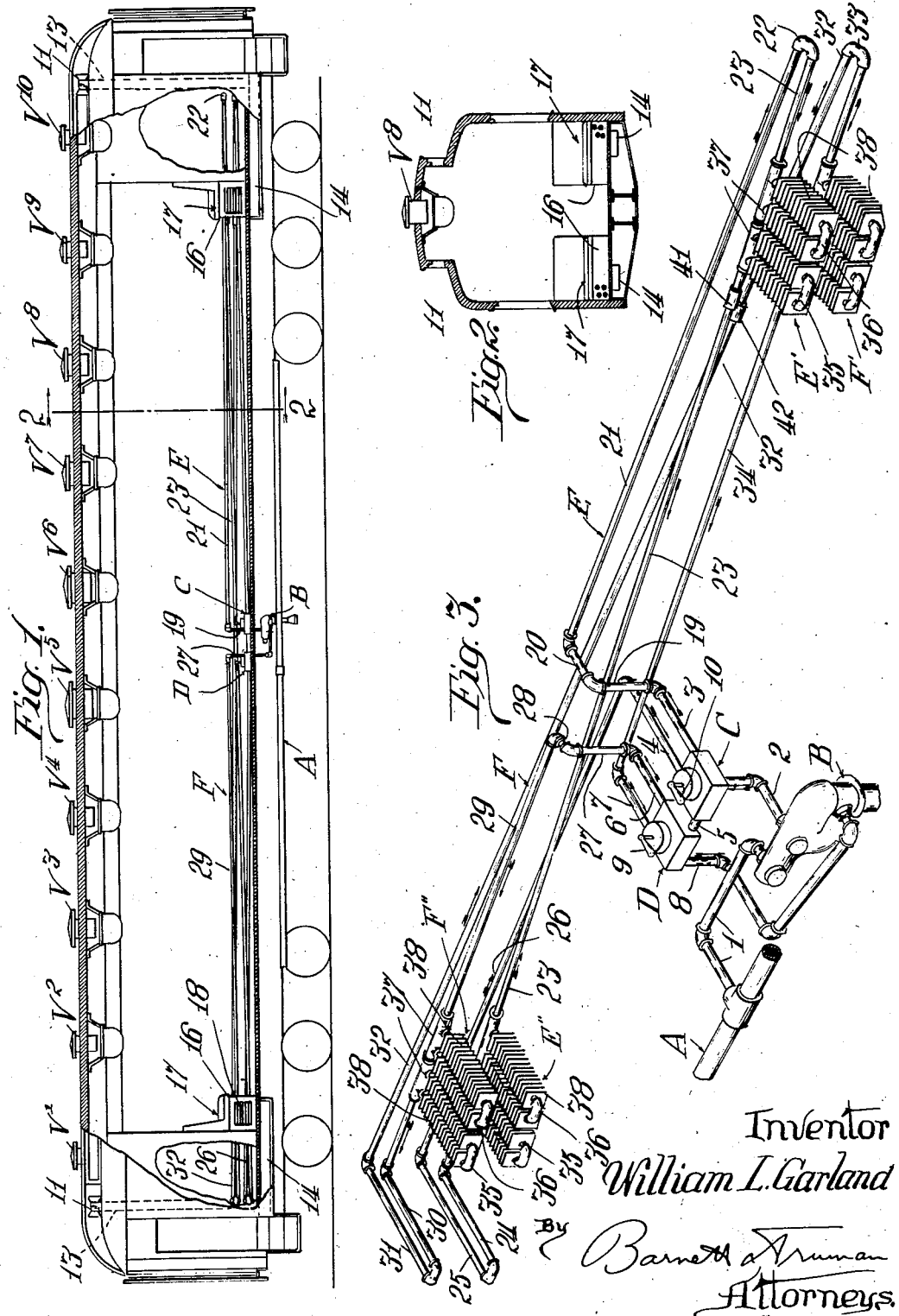
Inventor
William L. Garland
By Barnett a Truman
Attorneys.

Oct. 25, 1932.  W. L. GARLAND  1,883,896
CAR HEATING SYSTEM
Filed April 23, 1928   3 Sheets-Sheet 2
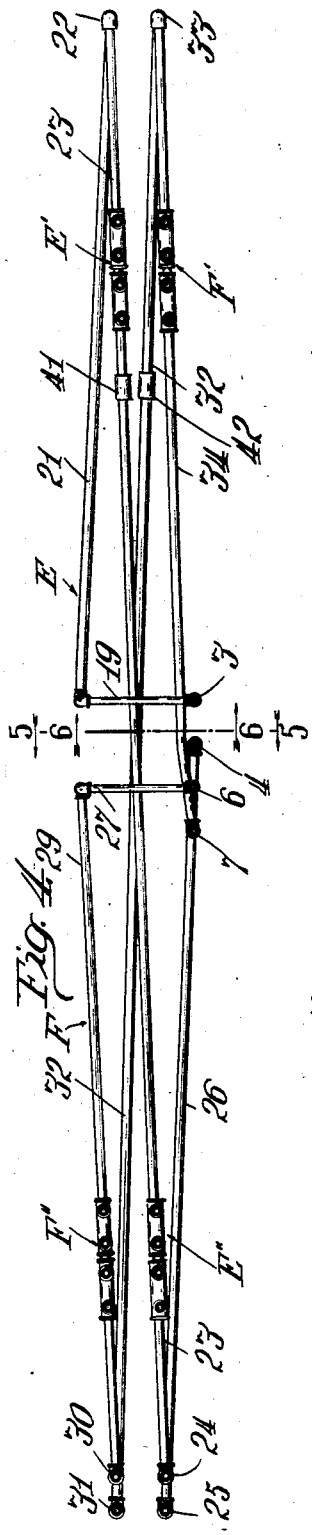
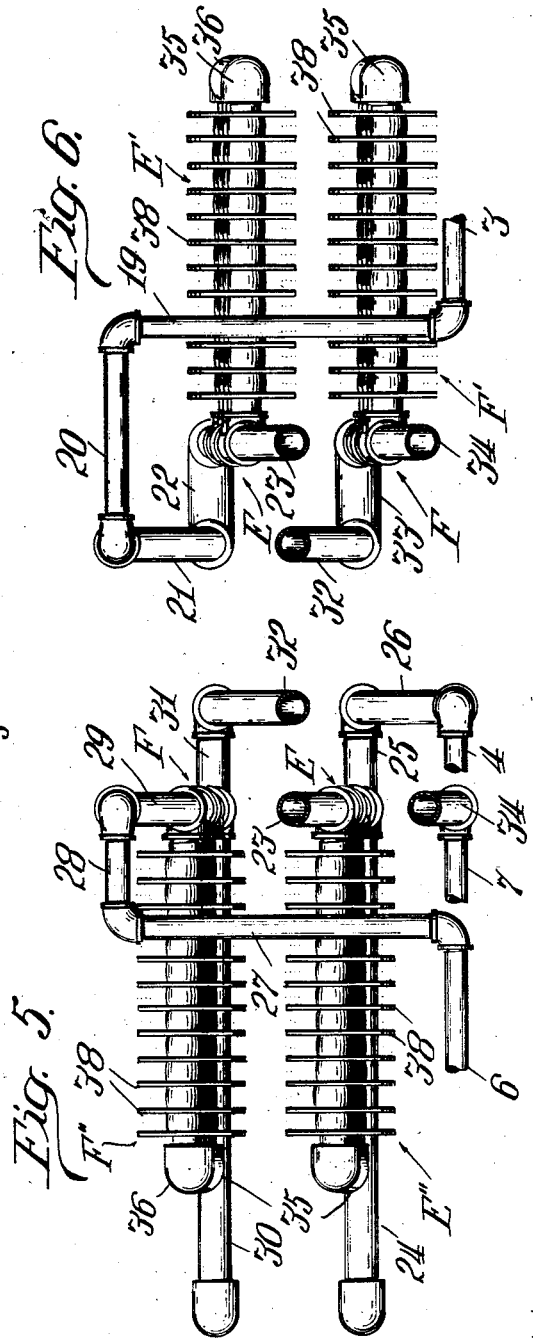
Inventor
William L. Garland
By
Barnett & Truman
Attorneys Oct. 25, 1932.  W. L. GARLAND  1,883,896
CAR HEATING SYSTEM
Filed April 23, 1928    3 Sheets-Sheet 3
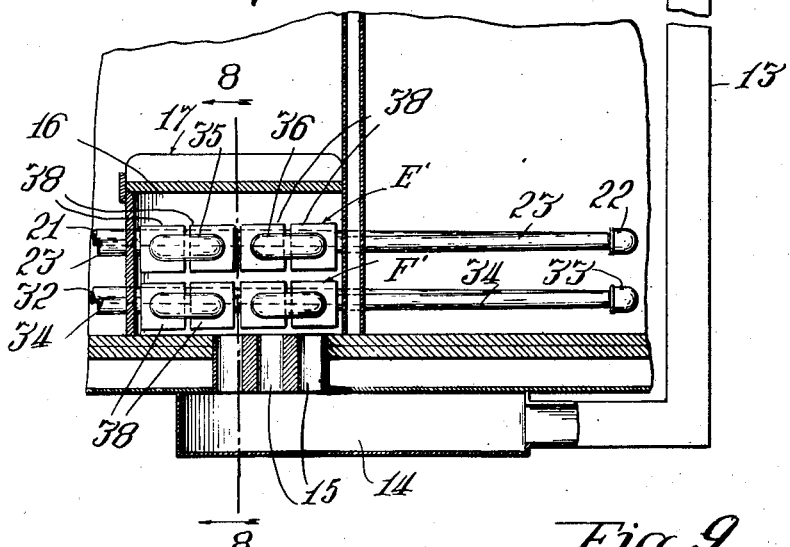
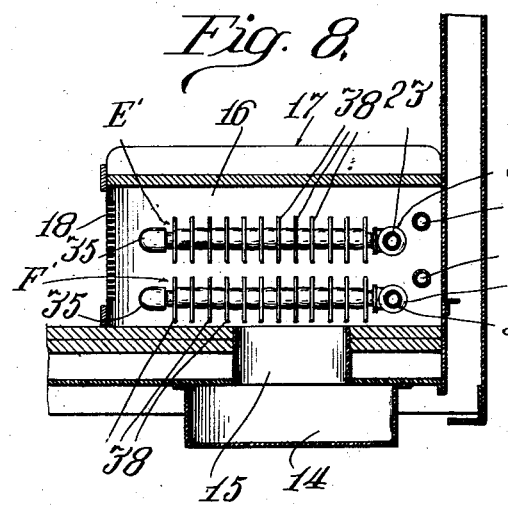
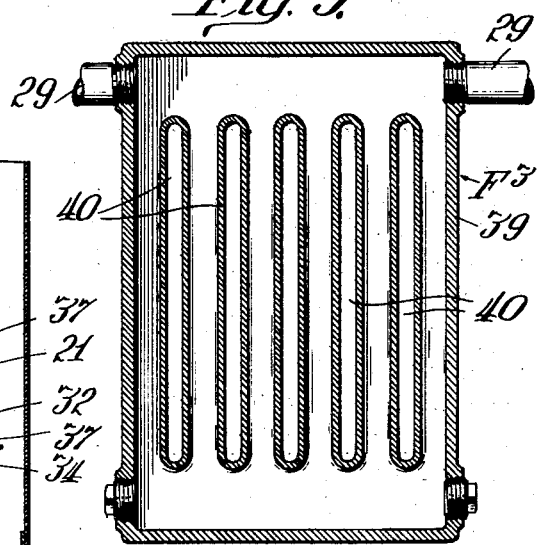
Inventor
William L. Garland
By Barnett & Truman
Attorneys Patented Oct. 25, 1932

1,883,896

UNITED STATES PATENT OFFICE

WILLIAM L. GARLAND, OF LLANERCH, PENNSYLVANIA, ASSIGNOR TO VAPOR CAR HEATING COMPANY, INC., OF CHICAGO, ILLINOIS, A CORPORATION OF NEW YORK

CAR HEATING SYSTEM

Application filed April 23, 1928. Serial No. 272,165.

This invention relates to a new and improved system for heating and ventilating railway cars, and more particularly to a system in which steam or vapor heat is utilized for pre-heating or tempering the air before it is delivered into the car, subsequently heating by the same radiating means the air within the body of the car, and exhausting the air from the car at points removed from the air intakes.

Briefly described, the system utilizes a pair of similar air-intakes, one at each end of the car, each of which delivers this air through the heating box located conveniently beneath the bulk-head seat at the end of the car. The steam heating coils which extend throughout the length of the car are provided with auxiliary coils within the heating boxes which serve to pre-heat or temper the air before it passes into the main body of the car. This air is subsequently heated in the usual manner while within the car, and the exhausted air is removed through a plurality of ventilators situated at intervals throughout the length of the car roof. These ventilators are so proportioned that the greater proportion of the air will be exhausted adjacent the center of the car, thus compelling a circulation of air from the two car ends. It will be understood that the heating, and air intake mechanism, is duplicated along each side of the car, the air being exhausted through a single series of ventilators arranged centrally along the car roof.

One object of this invention is to provide a new and improved heating and ventilating system such as briefly described hereinabove and as disclosed more in detail in the specifications which follow.

Another object is to provide a system for pre-heating air before its delivery into the car, subsequently heating the air within the car body, and exhausting the air from the car at points removed from the intake points.

Another object is to provide a single steam heating system for pre-heating the air and also heating the air within the car.

Another object is to provide a heating system of this type embodying two distinct radiating coils extending from end to end of the car and each provided with means for heating the incoming air at each end of the car, the coils being adapted to be used either singly or simultaneously as may be necessary. Another object is to provide an improved system of piping, whereby these independent coils may be conveniently interlocked within the limited space available beneath the seats and adjacent the side wall of the car.

Other objects and advantages of this invention will be more apparent from the following detailed description of one approved form of the apparatus.

In the accompanying drawings:

Fig. 1 is a longitudinal vertical section through a railway car equipped with this improved apparatus.

Fig. 2 is a transverse section taken substantially on the line 2—2 of Fig. 1.

Fig. 3 is a perspective view of the elements of the heating apparatus, located adjacent one side wall of the car.

Fig. 4 is an elevation of the longitudinal pipes at one side of the car, the connected lateral pipes being indicated in section.

Fig. 5 is a transverse section through this piping, on a larger scale, taken substantially from the line 5—5 of Fig. 4 and looking in the direction of the arrows.

Fig. 6 is a section similar to Fig. 5 but looking in the opposite direction. See the arrows 6—6 of Fig. 4.

Fig. 7 is a vertical section through the air intake mechanism at one corner of the car.

Fig. 8 is a vertical section, taken substantially on the line 8—8 of Fig. 7.

Fig. 9 is a horizontal section through a different form of auxiliary heater.

The heating system used is a low pressure steam system of the general type disclosed in the reissue patent to Gold and Russell, No. 16,487, granted November 23, 1926. The system comprises the steam train line or supply pipe A, vapor regulator B, control valves C and D, and the separate radiator coils E and F, each of which extends the full length of the car along one side wall thereof. It is to be understood that all of this mechanism is duplicated at the opposite side of the car, both systems being fed, however, from the same supply pipe A. The high pressure steam flows from train line A through pipe 1 to the vapor regulator B where its pressure is reduced so that steam at substantially atmospheric pressure flows through pipe 2 into the control valve C. From valve C steam flows through pipe 3 into the radiator coil E from which coil it returns through pipe 4 to valve C, thence passing through pipe 5 to the similar control valve D, from which steam flows through pipe 6 and returns through pipe 7 from the other radiator coil F. The returned steam and condensate passes from valve D through pipe 8 to the control chamber of vapor regulator B. When both valves C and D are open, steam will flow through both radiator coils E and F so as to utilize the maximum heating capacity of the system. If one valve (for example) is closed, the steam will be short-circuited through that valve and will not pass through the corresponding radiator F, only the radiator E now functioning to heat the air in the car. In this case, the returning steam from radiator E passes from pipe 4 through valve C, pipe 5, directly through valve D to pipe 8 and thence back to the vapor regulator B. In an exactly similar manner the valve C can be closed to cut off steam for the other radiator coil E. These valves can be operated manually by means of the control levers 9 and 10, or may be thermostatically controlled to maintain certain predetermined temperatures within the car. As will be explained more in detail hereinafter, each radiator coil E and F extends independently to each end of the car, and to each of the air pre-heating boxes, so that all of the heating functions can be performed by one of the radiators independently of the other, although of course the amount of heat furnished will be correspondingly decreased.

At each upper end corner of the car is located an air intake 11 (see Figs. 1 and 7), provided with an automatic flap valve 12 so that no matter which direction the car is traveling air will be directed downwardly through conduit 13 into a chamber 14 beneath the car, from which it is forced upwardly through passages 15 into the heating box 16, which may conveniently be located beneath the bulk head seat 17 at the end of the car. This incoming air is forced to flow over and around the heaters E' and F' located within the box 16, and then flows out through grill 18 at the aisle end of the seat into the main body of the car. In this way fresh air is constantly supplied at the four corners of the car, and this air is tempered or pre-heated before entering the car. It is not the aim of this apparatus to heat this incoming air to the desired temperature of occupancy, but merely to temper the air or remove its chill before its entry into the car, after which the body of air in the car is heated in the usual manner by the main radiator coils E and F.

A series of ventilators $V^1$ to $V^{10}$ inclusive are located at suitable intervals in the upper deck of the car (see Figs. 1 and 2), the centrally positioned ventilators such as $V^5$ and $V^6$ being of greater capacity than the ventilators toward the ends of the car, so that the air within the car will circulate from the ends toward the center. Usually the sizes of the individual ventilators of the series will be progressively larger from each end toward the center of the car.

The specific piping system for the radiators E and F will now be described. It will be understood that the space available for these pipes adjacent the side of the car and beneath the car seats is quite limited, due to the very low seats now used. The pipes of each radiator coil must slope downwardly continuously from the inlet to the outlet end in order that the radiator shall drain. Furthermore the pipes of each coil must be so positioned that the superposed auxiliary heaters E' and F' (or E" and F") in the heating boxes may be respectively supplied with steam from the two separate coils. According to this invention the piping system is so designed that there are only two rows of pipes adjacent the wall (a back row against the wall and a second row directly in front thereof) and in all parts of the car there are only two superposed pipes in each row, one of these pipes being a part of the radiator E, and the other pipe a part of the radiator F. This system of piping is best shown in Figs. 3, 4, 5 and 6. It should be understood that in all of these figures the vertical spacing between the pipes has been greatly exaggerated in proportion to the length and diameter of the pipes, in order to better illustrate the drainage system. Actually, the superposed pipes are quite closely positioned. The inlet pipe connection 3 from valve C leads upwardly at 19 and rearwardly at 20 to connect with the upper end of the short or half car length pipe 21 of radiator E, which runs in the back row to one end of the car. Pipe 21 there joins through connection 22 with a pipe 23 which leads back the full length of the car in the front row. Adjacent the two ends of the car, this front row pipe 23 connects with and feeds the two auxiliary heaters E' and E" in the heating boxes 16. At the opposite end of the car pipe 23 connects through the pipe loop 24, 25 with a short or half car length pipe 26 leading back, in the back row, to the return pipe 4, which passes out to valve C. The pipe loop 24—25 is for the purpose of supplying additional heat to a compartment at the end of the car. It will be understood that such additional pipe loops might be used at either or both ends of the car. It will be noted that the inlet end of pipe 21 is situated at the highest level, and the exit end of pipe 26 at the lowest level so that there is a continuous down slope to the pipes 21, 23 and 26 so that condensate will drain through the coil E back to the control valve C. The valves C and D are provided with means (not here shown) for removing condensate.

In a similar manner, the feed pipe 6 from valve D leads upwardly at 27 and rearwardly at 28 to connect with the inlet end of the short half-car length pipe 29 of radiator F, which extends in the front row of piping to one end of the car (the opposite end from that to which pipe 21 leads). The lower end of pipe 29 connects through pipe loop 30, 31 (similar to and positioned directly above the pipe loop 24, 25), with the upper end of the full car length pipe 32 which extends the length of the car in the rear row of pipes. The lower end of pipe 32 connects through fitting 33 with the half car length pipe 34 which returns in the front row to the center of the car where it connects with return pipe 7 leading back to valve D. It will be noted that the two short pipes 29 and 34 of the radiator F are located in the front row of pipes, above and below the respective ends of the full car length pipe 23 of radiator E. The auxiliary heater F″ for one of the heating boxes 16 is located directly above the auxiliary heater E″ and fed from pipe 29. Similarly, the other auxiliary heater F′ is situated directly below the heater E′ and fed from pipe 34.

It will now be apparent that a very compact piping arrangement is provided consisting of two back row pipes and two front row pipes, and two auxiliary heating units at each end directly superposed and fed directly from the front row pipes. At the same time, this system is divided into two entirely distinct units, so that one of them may be completely disconnected and still have heat supplied in all parts of the car. Furthermore, the pipes of each of these two radiating systems slope gradually and continuously downward from their inlet to their outlet ends so that proper drainage is obtained.

In their preferred form, each of the auxiliary heaters E′, F′, E″, and F″, consists of two or more pipe loops 35 and 36, connected into one of the radiating pipes, for example, 29, by means of suitable fittings 37. These pipe loops may be provided with suitable radiating fins 38 so as to increase the radiating capacity of the auxiliary heaters. By fitting the pipe with these fins, its radiating surface is so increased that it will radiate substantially four times as much heat as a similar sized pipe unprovided with the fins. In this way the radiating capacity of the auxiliary heaters may be considerably increased so as to satisfactorily temper the incoming cold air. It will be noted that the radiators E and F serve the double function of supplying heating medium to the auxiliary heaters within the inlet boxes 16, and also provide radiating pipes consisting of four adjacent pipe sections extending throughout the length of the car.

In Fig. 9 is shown a modified form of auxiliary heater F³, which might be substituted for any one of the heaters (for example F″) of the type previously described. This consists simply of a rectangular hollow box casting 39, provided with a plurality of elongated air passages 40, the two sections of the radiator pipe 29 being connected into this casing at one end as shown.

According to this system of car heating and ventilating, an adequate supply of fresh air is continuously furnished, and caused to circulate throughout the car. The low-pressure steam heating system is utilized to first temper the incoming air, and then supply additional heat to the air within the car in the usual manner. Without unduly increasing the space required for the radiating pipes, the system is so divided that one-half the radiating surface can be thrown entirely out of service in mild weather, or when the desired temperature has been established within the car, and the remaining half of the radiating surface is so distributed that all parts of the car are served in the same relative proportions as if the entire radiating system were operative.

In order to simplify the drawings, the various supporting means for the different radiating pipes have not been illustrated, but may be of usual form. In order to permit the necessary expansion and contraction of the pipes, the full length pipe sections 23 and 32 are provided with telescopic slip joints 41 and 42, and if necessary the shorter pipes may be provided with similar connections although the transverse pipe connections at the ends and center of the car will ordinarily provide for the necessary expansion and contraction.

I claim:

1. In combination with a railway car, a pair of air intakes, one adjacent each end of the car, means in each intake for preheating the air before it enters the car, means for heating the air in the car throughout the length of the car, and a series of ventilators positioned at spaced intervals throughout the length of the upper portion of the car for exhausting the air from the car body, the ventilators situated adjacent the center of the car being of greater capacity than the ventilators situated adjacent the ends of the car.

2. In combination with a railway car, a heating and ventilating system comprising radiating coils within the car and extending throughout the length of the car, air intake passages discharging into the lower portion of the car adjacent each end thereof, auxiliary coils in said passages and fed from the main heating coils for preheating the incoming air, and a series of ventilators positioned at spaced intervals in the upper portion of the car for exhausting the air from the car body, the ventilators situated adjacent the center of the car being of greater capacity than the ventilators situated adjacent the ends of the car.

3. In combination with a railway car, a heating and ventilating system comprising a pair of separate heating coils within the car and extending throughout the length of the car along one side thereof, a pair of heating boxes within the car, one adjacent each end thereof, a pair of similar heaters in each box, one heater of each pair being connected with and fed from each coil, an air intake at each end of the car leading into the adjacent heating box, the boxes being formed with outlets through which the air heated therein is discharged into the car, and means for exhausting the air from the car toward the center thereof.

4. In combination with a railway car, a plurality of ventilators positioned centrally of the car in the upper portion thereof, a heating box adjacent each lower corner of the car, having an outlet leading into the car, an air intake leading into each upper corner of the car from the outer air, a conduit at each corner of the car connecting the adjacent air intake with the adjacent heating box for delivering air to the car through the heating box, a train steam pipe, a pair of radiating coils, one of which extends lengthwise of each side of the car, a control valve between each coil and the train pipe, an auxiliary heater in each heating box, and connections for supplying heating medium from the coil at each side of the car to the auxiliary heaters in the boxes at that side of the car.

5. In combination with a railway car, a plurality of ventilators positioned centrally of the car in the upper portion thereof, a heating box adjacent each lower corner of the car having an outlet leading into the car, an air intake leading into each upper corner of the car from the outer air, a conduit at each corner of the car connecting the adjacent air intake with the adjacent heating box for delivering air to the car through the heating box, a train steam pipe, a pair of radiating coils extending lengthwise of each side of the car, a control valve between each coil and the train pipe, and a pair of auxiliary heaters in each heating box, and connections for supplying heating medium to one of the auxiliary heaters in each box from each coil at that side of the car.

6. In combination with a railway car, a heating and ventilating system comprising a heating coil within the car and extending throughout the length of the car along one side thereof, a pair of heating boxes within the car, one adjacent each end thereof and each having a discharge outlet leading into the car, an auxiliary heater in each box, connections for supplying the auxiliary heaters with heating medium from the coil, a pair of air intakes, one adjacent each end of the car and leading to the adjacent heating box, and means for exhausting air from the car adjacent the center thereof.

7. In combination with a railway car, a heating and ventilating system comprising a heating coil within the car and extending throughout the length of the car along one side thereof, a pair of heating boxes within the car, one adjacent the lower portion of each end thereof, an auxiliary heater in each box, connections for supplying the auxiliary heaters with heating medium from the coil, a pair of air intake conduits, one leading from the outer air adjacent one upper end of the car into the heating box in the adjacent end of the car, and the other leading from the outer air adjacent the other upper end of the car into the heating box at that end of the car, each heating box having an outlet for discharging the air heated therein into the adjacent end portion of the car, and means for exhausting air from the car adjacent the upper central portion thereof.

WILLIAM L. GARLAND.